United States Patent
Wang et al.

(10) Patent No.: US 9,746,553 B2
(45) Date of Patent: Aug. 29, 2017

(54) METHOD FOR GENERATING AN IMAGE AND HANDHELD SCREENING DEVICE

(71) Applicant: SONY CORPORATION, Minato-ku (JP)

(72) Inventors: Qi Wang, Stuttgart (DE); Furkan Dayi, Stuttgart (DE); Ralf Boehnke, Esslingen (DE); Marcel Blech, Herrenberg (DE); Miquel Testar, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 375 days.

(21) Appl. No.: 14/053,885

(22) Filed: Oct. 15, 2013

(65) Prior Publication Data
US 2014/0168007 A1  Jun. 19, 2014

(30) Foreign Application Priority Data
Dec. 19, 2012  (EP) .................................... 12008452

(51) Int. Cl.
| | |
|---|---|
| *G01S 13/89* | (2006.01) |
| *G01S 13/88* | (2006.01) |
| *G06T 3/40* | (2006.01) |
| *G01S 7/295* | (2006.01) |

(52) U.S. Cl.
CPC ............ *G01S 13/89* (2013.01); *G01S 13/887* (2013.01); *G06T 3/4038* (2013.01); *G01S 7/295* (2013.01)

(58) Field of Classification Search
CPC ...... G01S 13/89; G01S 13/887; G01S 13/888; G01S 7/295; G06T 3/4038
See application file for complete search history.

(56) References Cited

U.S. PATENT DOCUMENTS

| | | | | | |
|---|---|---|---|---|---|
| 5,073,782 | A | * | 12/1991 | Huguenin | ............... G01S 7/024 250/332 |
| 5,227,800 | A | * | 7/1993 | Huguenin | ............... G01S 7/024 250/332 |
| 6,417,797 | B1 | * | 7/2002 | Cousins | .................. G06F 15/02 342/175 |
| 6,777,684 | B1 | * | 8/2004 | Volkov | ............... G01N 21/3581 250/341.1 |
| 7,948,428 | B2 | * | 5/2011 | Lovberg | ............... G01K 11/006 342/22 |

(Continued)

FOREIGN PATENT DOCUMENTS

| | | |
|---|---|---|
| CN | 1849527 A | 10/2006 |
| CN | 101840003 A | 9/2010 |

OTHER PUBLICATIONS

"Weapons and Non-permitted Devices Detector (WANDD)", Luna Innovations Incorporated, 228732, Nov. 2009, 48 pages.

(Continued)

*Primary Examiner* — Matthew M Barker
(74) *Attorney, Agent, or Firm* — Oblon, McClelland, Maier & Neustadt, L.L.P.

(57) ABSTRACT

A method for generating an image is provided including taking a first active radar image of an object from a first position with a handheld screening device; taking a second active radar image of the object from a second position with the handheld screening device; and generating a third image based on the first active radar image and the second active radar image. A corresponding handheld screening device is provided as well.

7 Claims, 4 Drawing Sheets

(56) References Cited

U.S. PATENT DOCUMENTS

| | | | | |
|---|---|---|---|---|
| 8,077,072 B2* | 12/2011 | Mohamadi | ............ | G01S 13/888 342/176 |
| 8,593,157 B2* | 11/2013 | Adams | .................... | G01S 13/89 324/244.1 |
| 8,779,965 B2* | 7/2014 | Sentelle | .................. | G01S 13/32 242/128 |
| 8,957,810 B2* | 2/2015 | Babakhani | .............. | G01S 13/89 324/337 |
| 2005/0128124 A1* | 6/2005 | Greneker, III | ........ | A61B 5/0507 342/22 |
| 2007/0080850 A1 | 4/2007 | Abe et al. | | |
| 2007/0139248 A1* | 6/2007 | Baharav | .................. | G01S 13/89 342/22 |
| 2007/0139249 A1* | 6/2007 | Baharav | .................. | G01S 13/89 342/22 |
| 2009/0195435 A1 | 8/2009 | Kapilevich et al. | | |
| 2009/0201192 A1 | 8/2009 | Tokoro et al. | | |
| 2010/0117885 A1 | 5/2010 | Holbrook et al. | | |
| 2010/0302240 A1 | 12/2010 | Lettvin | | |
| 2011/0242274 A1* | 10/2011 | Yamaji | .................. | G06T 3/4038 348/36 |

OTHER PUBLICATIONS

U.S. Appl. No. 14/057,093, filed Oct. 18, 2013, Wang, et al.
Office Action issued in Chinese Application No. 201310698375.5 on Feb. 3, 2017.

\* cited by examiner

METHOD FOR GENERATING AN IMAGE AND HANDHELD SCREENING DEVICE

BACKGROUND

Field of the Disclosure

The present disclosure relates to a method for generating an image and a handheld screening device.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A variety of conventional systems are available for obtaining images through visibly opaque materials. For example, X-ray systems have been utilized to acquire images of objects that are hidden from visual inspection by visibly opaque materials (e.g., anatomical structures or objects within a luggage). X-ray systems, however, have many disadvantages. By way of example, such systems can be expensive and bulky, and can utilize ionizing radiation that may pose health hazards to humans. Moreover, X-ray systems typically detect a beam that has been transmitted through a target sample, thus requiring access to both sides of the target. Ultrasound imaging systems, in turn, require the presence of a continuous, high quality acoustic transmission path between a transducer and a "hidden" object of interest. In many cases, however, such acoustic transmission paths may be not available and depending on the medium the resolution may be very coarse.

Millimeter-wave imaging systems have recently been developed for securing screening applications. Millimeter-waves are particular useful for detecting objects in an active radar system, i.e. by emitting electromagnetic waves in the millimeter-wavelength region and detecting reflected or scattered electromagnetic waves.

There is a need to further improve the usability of handheld screening devices based on millimeter-wave imaging systems.

SUMMARY

A method for generating an image is provided including taking a first active radar image of an object from a first position with a handheld screening device; taking a second active radar image of the object from a second position with the handheld screening device; and generating a third image based on the first active radar image and the second active radar image.

Further, a handheld screening device is provided including an active radar scan unit to take a first active radar image with a first field of view of an object and to take a second active radar image with a second field of view of the object; and a processor configured to generate a third image based on the first active radar image and the second active radar image.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
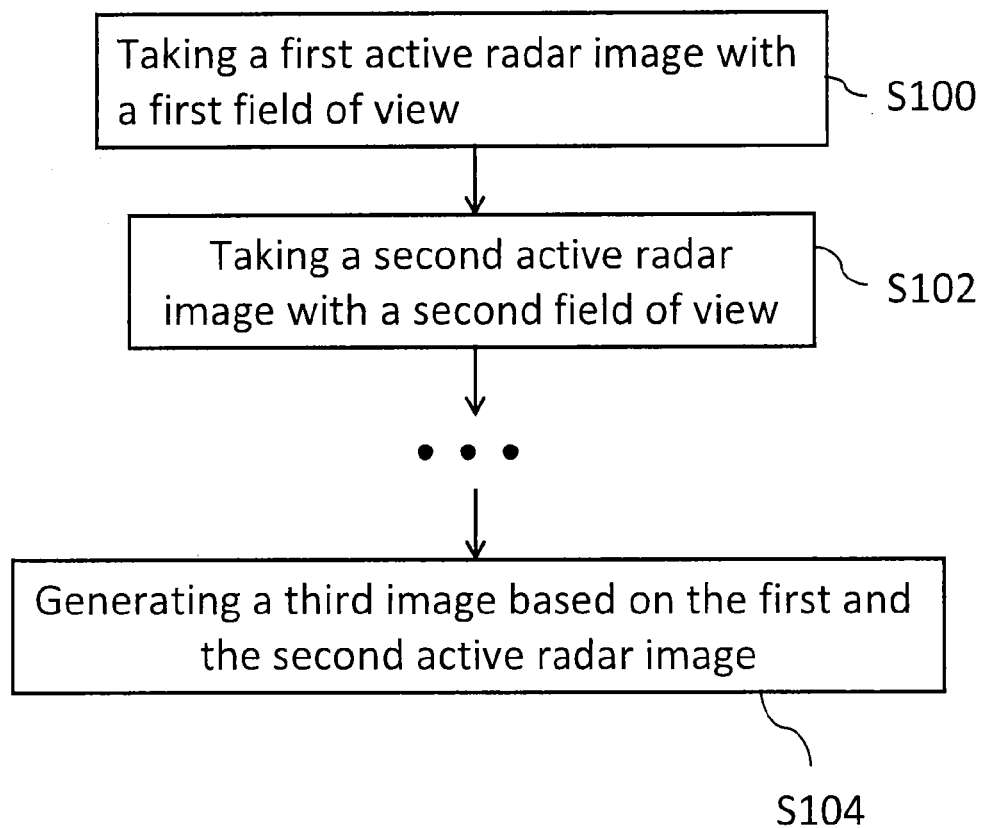
FIG. 1 shows schematically method steps according to an embodiment of the invention.

Referring now to the drawings, wherein like reference numerals designate identical or corresponding parts throughout the several views, FIG. 1 depicts steps of a method for generating an image according to an embodiment of the invention.

In step S100 a first active radar image is taken by a handheld screening device with a first field of view.

The term "handheld" used throughout the description might be understood to describe a device that can be carried (i.e. it is mobile) and operated by one or two hands and has preferably a weight less than 3 kg. A "handheld" device should approximately have geometrical dimensions (height, width, length) and weight as objects that are normally operated and/or carried by a person using one hand or two hands. Examples for such objects are. a book, a smart phone, a cellular phone, an electronic reader, a tablet computer, a notebook computer, a stand still camera, a video camera, binoculars etc. Nevertheless, it should be understood that the device itself might be suited to be handheld, but in a particular application is mounted on a tripod or is otherwise fixed to a support when a stationary use of the device is envisaged.

An active radar scan can be taken e.g. by an active millimeter-wave sensor or a radar scan sensor. The active radar scan is generated by emitting electromagnetic waves in an extended mm-wavelength region from a radar source, e.g. a handheld screening device or an active radar scan unit to an object and detecting electromagnetic waves reflected or scattered from the object. "Detecting" might include capturing of the scattered electromagnetic waves by an antenna (or multiple antennas) and radio frequency electronics followed by analogue-to-digital conversion and digital processing and analysis. The frequency of the millimeter wavelength region radiation is considered to be within 10 GHz to 500 GHz.

The term "image" as used throughout the description includes any information (reflectivity, depth, shape, contours, polarimetric scattering, polarization change etc.) that can be derived from evaluating the reflected or scattered electromagnetic waves.

In order to get a one- or two-dimensional image, a position of the radar source (and of a capture unit for reflected or scattered electromagnetic waves) should be moved with respect to a position of the object. For instance, it is possible to move the radar source in order to change its position. A further possibility is changing the emission direction of the radar electromagnetic wave e.g. by a moving reflector, grating or some electronic beamforming means.

Then in a step S102 a second active radar image is taken with a second field of view. In general, the second field of view can be generated by changing the position of the radar source. The position might be closer or farer away from the object, lower or higher, or might be located more to the left or right side or in any combination thereof compared to the position used for taking the first active radar image. Since the object reflectivity and visibility typically depends on the incident illumination angle to the object, the second active radar image will be different from the first active radar image. Some areas of a specific scene might have better visibility/contrast in one field of view compared to other field of views.

As it is depicted only schematically in FIG. 1 by a row of dots, further steps might be included for taking further active radar images with further field of views.

In step S104 a third image is generated based on the first active radar image and the second active radar image. The image generation method combines multiple fields of view (FoV) images to avoid patchy radar images. If, as described above, further active radar images are taken, it is of course possible to generate the third image based on the first, the second and the further active radar images according to corresponding rules as combining the first and the second active radar image.

Figure 2:
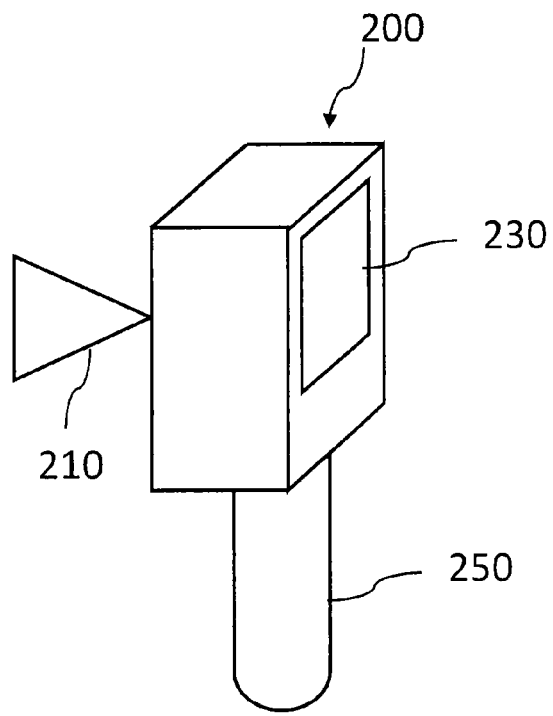
FIG. 2 shows schematically a perspective view of a handheld screening device according to an embodiment of the invention.
Figure 3:
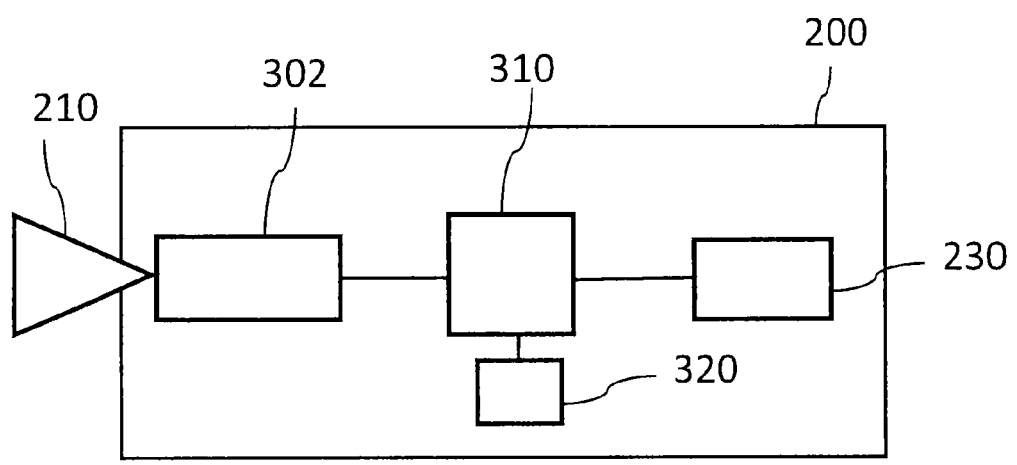
FIG. 3 shows schematically a block diagram of a handheld screening device according to an embodiment of the invention.

FIG. 2 depicts a perspective view and in FIG. 3 a schematic block diagram of a handheld screening device 200 is depicted.

The handheld screening device 200 includes an active radar scan unit 302 adapted to emit a radar signal and to receive reflected radar signals, which might be emitted in a cone form 210. Consequently, the active radar scan unit is adapted to take a first active radar image with a first field of view of an object and to take a second active radar image with a second field of view of the object. A processor 310 is included into the handheld screening device 200, which controls the active radar scan unit 302 and is configured to generate the third image based on the first active radar image and the second active radar image.

The handheld screening device 200 might further include a display 230 to display the third image.

A grip 250 is provided so that a user can hold the handheld screening device 200 with one hand and can operate it easily.

It is also possible that the display 230 displays the first active radar image and/or the second active radar image. Before displaying the first active radar images and/or the second active radar image further image processing might be performed, e.g. by calculating and displaying outlines, pictograms, shapes etc.

In order to detect different positions of the handheld screening device 200 a position sensor 320 for one, two or three axes and/or for detecting rotational movements is integrated, e.g. an accelerometer, a rotation sensor, a gyroscope, a distance radar sensor, an inertial sensor etc.

Figure 4:
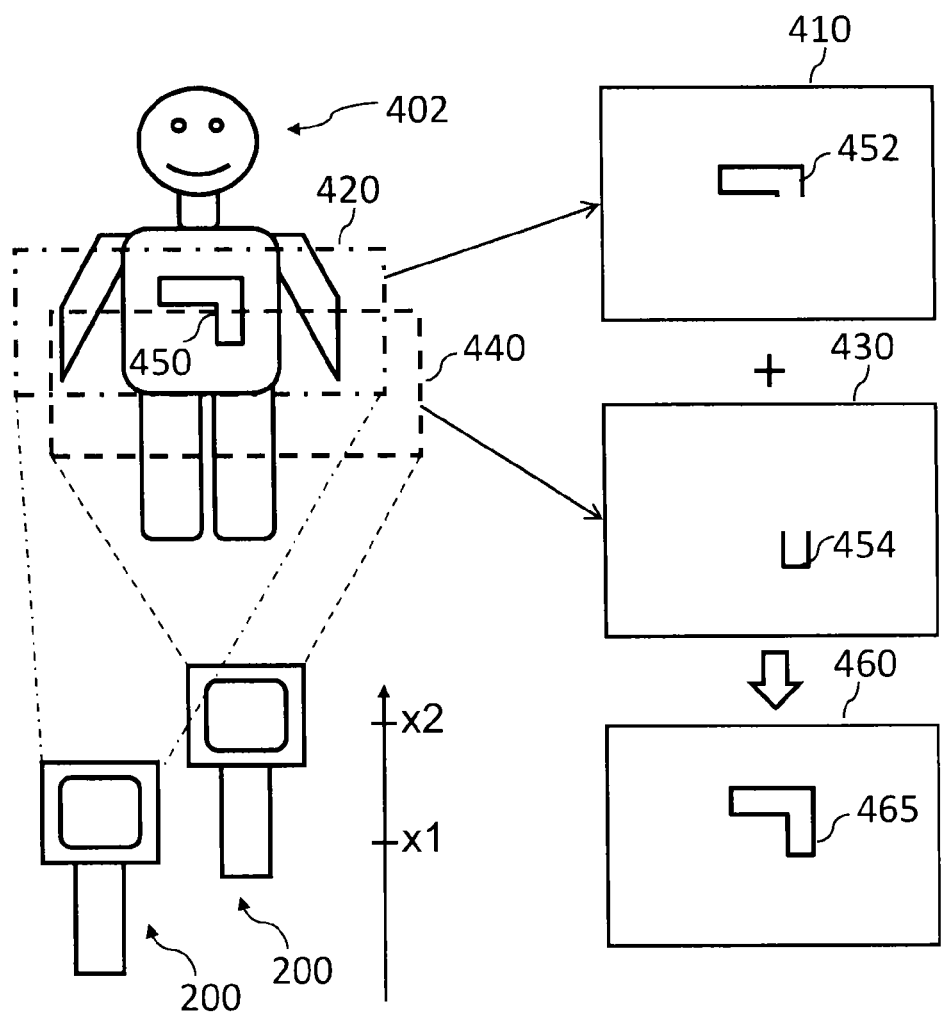
FIG. 4 shows schematically generating an image from two active radar scans according to an embodiment of the invention.

In FIG. 4 the method is explained exemplary by referring to a security application. In order to detect dangerous devices, e.g. arms like pistols, guns, knives, etc. or other devices with a characteristic shape, e.g. bottles with liquids, the handheld screening device 200 is used. Of course, the method can be equally applied to search for other devices that can be hidden.

The handheld screening device 200 takes images of an object, e.g. a person 402. The objects can include human beings wearing clothes, suitcases or boxes or any other object that can be used to hide a device as described hereinbefore. Whereas it should be understood that the devices might be searched for due to security reasons, it is equally well possible that the devices should be identified due to other reasons, for instance, an organizer of a festival is searching for bottles of liquids, since he wants to forbid bringing such bottles into the festival, because he wants to sell his own products.

In a first position x1 the handheld screening device 200 takes a first active radar image 410 with a first field of view 420. In a second position x2 the handheld screening device 200 takes a second active radar image 430 with a second field of view 440. Exemplarily, the person 402 hides a gun 450 under his clothes. For instance, in the first position x1 the first field of view 420 results in the first active radar image 410 depicting the muzzle 452 of the gun, whereas the second field of view 440 results in the second active radar image 430 depicted only the handle 454 of the gun.

For an observer, it might be difficult to detect the complete gun 450 from one of the two separate images 410, 430. Therefore, a third image 460 is generated based on the first active radar image 410 and the second active radar image 430. In the third image 460 the image 465 of the gun 450 is complete, hence, the gun 450 can be easily detected and an alarm can be triggered.

The position detector 320 of the handheld screening device 200 can be used in order to distinguish between the first position x1 and the second position x2. The positions x1 and x2 or at least the distance between the first position x1 and the second position x2 is used by the processor 310 to combine the first active radar image 410 and the second active radar image 430. For instance, with the known positions, known radar cones 210 and reflectivity behavior of materials of possible hidden objects, expected field of views can be determined. The processor is enabled to analyze the first active radar image 410 and the second active radar image 430 in order to extract characteristic features of the images and to use the characteristic features in order to generate a combined image.

For instance, it is possible to use an optical image taken at every scanning position x1, x2 and stitching or combining them by software algorithms, thereafter using the position parameters (provided by a position sensor) to stitch or combine the radar images together by a further software algorithm for presentation/visualization to the operator.

Of course it is possible to take more than two active radar images with more than two fields of views from more than two positions and to combine those images into the third image.

Figure 5:
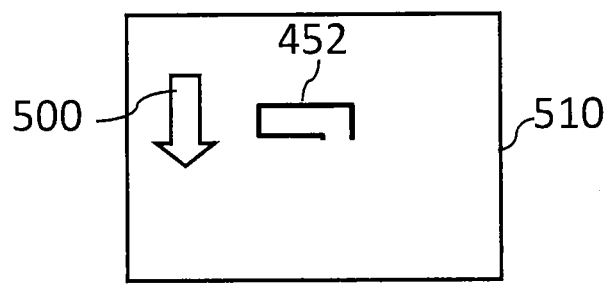
FIG. 5 shows schematically the use of a visual indication for indicating a scan direction according to an embodiment of the invention.

In FIG. 5 an image 510 is depicted, which might correspond to the first active radar image 410, showing the muzzle 452 of the gun, and a visual indication, exemplarily as an arrow 500, showing a scan direction to indicate to the user of the handheld screening device 200 the direction, in which the handheld screening device should be moved in order to arrive at the second position x2, in which the second active radar image should be taken.

Figure 6A:
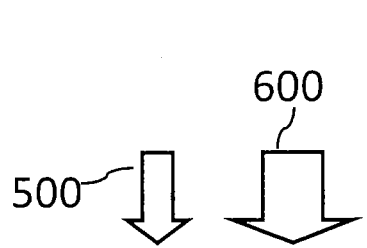
FIGS. 6a to 6e show exemplarily possible different visual indications according to a further embodiment of the invention.
Figure 6B:
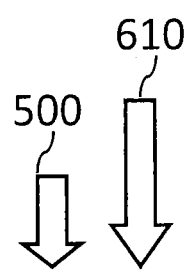

As is depicted in FIG. 6a the arrow could be used to indicate further information, e.g. the distance to the next position ("thin arrow 500" might mean far, "thick arrow 600" might mean close, or vice versa), or—as depicted in FIG. 6b, the length of the arrow could indicate the recommended speed of the movement of the handheld screening device ("short arrow 500" might mean "slow", "long arrow 610" might mean "fast" or vice versa). Of course the thickness of the arrow could be used to indicate the speed and the length could be used to indicate the distance.

Figure 6C:
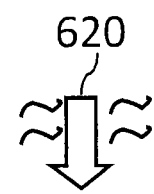

Further information could be given to the user as well, e.g. the arrow 620 could be displayed in a "shaking" or "trembling" manner (depicted in FIG. 6c) in order to give the indication to the user that the handheld screening device is shaking too much so that the image might not be good enough when the scan is performed or it might be too difficult to generate the third image, because of insufficient quality of the first or second active radar image.

Figure 6D:
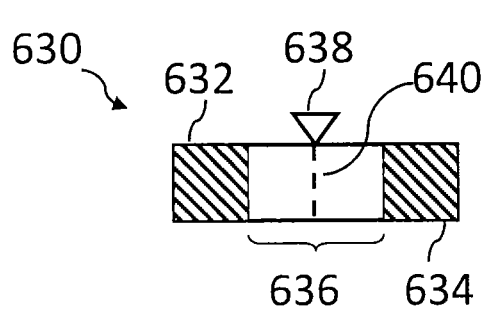

Possible other indications might include as depicted in FIG. 6d a bar 630, divided into three regions 632, 636, 634, wherein the first region 632 might indicate a distance to the object that is too far and the second region 634 that the distance to the object is too close to obtain a good active radar image, whereas the third region 636 indicates the optimal region for obtaining an active radar image with a good quality. The actual position of the handheld screening device 200 is indicated by an arrow 638 and optionally by a line 640.

Figure 6E:
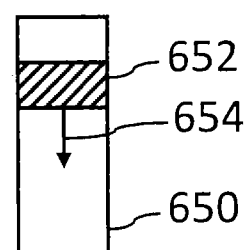

A further embodiment for the visual indication is depicted in FIG. 6e, wherein a bar 650 includes a moving bar 652, wherein the movement direction is depicted as an arrow 654.

However, further embodiments for visual indications are possible as well. The processor 310 evaluates signals from the position sensor 320 in order to generate the appropriate visual indication that guides the user into the correct scanning movement of the handheld screening device 200 in order to obtain a third image 460 with a good quality that allows the easy identification of hidden objects.

Obviously, numerous modifications and variations of the present disclosure are possible in light of the above teachings. It is therefore to be understood that within the scope of the appended claims, the invention may be practiced otherwise than as specifically described herein.

The present application claims priority to European Patent Application 12 008 452.0, filed in the European Patent Office on Dec. 19, 2012, the entire contents of which being incorporated herein by reference.

The invention claimed is:

1. A method for generating an image comprising:
taking a first active radar image of an object from a first position with a handheld screening device;
after the first active radar image is taken, determining, by a processor of the handheld screening device, a recommended second position of the handheld screening device from which a second active radar image of the object is to be taken, there being a between the first position and second position;
generating, by the processor, a visual indication indicating a direction from an actual position of the handheld screening device to a second position, a size of the visual indication corresponding to a distance to the second position;
displaying the visual indication on a display;
taking the second active radar image of the object from the second position with the handheld screening device, no image of the object being taken from positions within the gap; and
generating, by the processor, a third image based on the first active radar image and the second active radar image.

2. The method according to claim 1, further comprising:
taking at least one further active radar image of the object from at least one further position with the handheld screening device, wherein the third image is generated based on the first, the second, and the at least one further active radar image.

3. The method according to claim 2, further comprising displaying the third image on the display.

4. A handheld screening device including:
a display;
an active radar scanner configured to take active radar images of an object, and
a processor configured to
determine, after a first active radar image is taken by the active radar scanner from a first position of the handheld screening device, a recommended second position of the handheld screening device from which a second active radar image of the object is to be taken, there being a gap between the first position and the second position:
generate a visual indication indicating a direction from an actual position of the handheld screening device to the second position, a size of the visual indication corresponding to a distance to the second position,
cause the display to display the visual indication, and
generate a third image based on the first active radar image and the second active radar image taken by the active radar scanner from the second position with no image of the object being taken from positions within the gap.

5. The handheld screening, device according to claim 4, wherein
the active radar scanner is further configured to take at least one further active radar image with at least one further field of view from the object, and
the processor is further configured to generate the third image based on the first, the second, and the at least one further active radar image.

6. The handheld screening device according to claim 4, further including
a position detector configured to detect the first position of the handheld screening device, in which the first active radar image is taken, and the second position of the handheld screening device, in which the second active radar image is taken.

7. The handheld screening device according to claim 4, wherein the processor is further configured to
cause the display to display the third image.

* * * * *